United States Patent
Li et al.

(10) Patent No.: US 12,297,305 B2
(45) Date of Patent: May 13, 2025

(54) BINDER COMPOSITION AND SEPARATOR CONTAINING SAME

(71) Applicant: CONTEMPORARY AMPEREX TECHNOLOGY CO., LIMITED, Ningde (CN)

(72) Inventors: Lei Li, Ningde (CN); Haiyang Kang, Ningde (CN); Chengdong Sun, Ningde (CN); Yi Zheng, Ningde (CN); Shaohua Ai, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/765,315

(22) Filed: Jul. 7, 2024

(65) Prior Publication Data
US 2024/0360259 A1    Oct. 31, 2024

Related U.S. Application Data

(63) Continuation of application No. PCT/CN2022/121639, filed on Sep. 27, 2022.

(51) Int. Cl.
*C08F 220/18* (2006.01)
*C08K 7/26* (2006.01)
(Continued)

(52) U.S. Cl.
CPC .............. *C08F 220/18* (2013.01); *C08K 7/26* (2013.01); *C08K 9/08* (2013.01); *H01M 50/42* (2021.01);
(Continued)

(58) Field of Classification Search
CPC ............................ C08F 220/18; H01M 50/42
See application file for complete search history.

(56) References Cited

U.S. PATENT DOCUMENTS

2014/0242296 A1    8/2014  Motoda

FOREIGN PATENT DOCUMENTS

| CN | 112259913 A | * | 1/2021 |
| JP | 06145413 A | | 5/1994 |

(Continued)

OTHER PUBLICATIONS

CN 112259913A Machine Translation (Year: 2021).*

(Continued)

*Primary Examiner* — Catherine S Branch
(74) *Attorney, Agent, or Firm* — K&L Gates LLP

(57) ABSTRACT

A binder composition includes a polymer and ceramic particles, the polymer including structural units derived from a first-type monomer, a second-type monomer, and a third-type monomer, and a molar ratio of the first-type monomer, second-type monomer, and third-type monomer being (50 to 58):(40 to 44):(2 to 6); where the first-type monomer is selected from one or more compounds of formula I, the second-type monomer is selected from one or more compounds of formula II, and the third-type monomer is selected from one or more compounds of formula III. The binder improves the porosity of the separator, increases the ionic conductivity, and reduces the internal resistance, thereby enhancing the cycling performance of the secondary battery.

20 Claims, 2 Drawing Sheets

(51) Int. Cl.
*C08K 9/08* (2006.01)
*H01M 50/42* (2021.01)
*H01M 50/437* (2021.01)
*H01M 50/446* (2021.01)
*H01M 50/451* (2021.01)

(52) U.S. Cl.
CPC ....... *H01M 50/437* (2021.01); *H01M 50/446* (2021.01); *H01M 50/451* (2021.01); *C08K 2201/005* (2013.01)

(56) References Cited

FOREIGN PATENT DOCUMENTS

| | | |
|---|---|---|
| JP | 2007035542 A | 2/2007 |
| JP | 2014505344 A | 2/2014 |
| JP | 2019526693 A | 9/2019 |
| KR | 20180085512 A | 7/2018 |
| KR | 102084099 B1 | 3/2020 |
| WO | 2012029805 A1 | 3/2012 |
| WO | 2014136799 A1 | 3/2014 |
| WO | 2020020856 A1 | 1/2020 |
| WO | 2021251092 A1 | 12/2021 |

OTHER PUBLICATIONS

International Search Report received in the corresponding international application PCT/CN2022/121639, mailed Dec. 19, 2022.
The written opinion of ISA received in the corresponding international application PCT/CN2022/121639, mailed Dec. 19, 2022.
Zhong, Haoxiang et al. "The Polyacrylic Latex: an Efficient Water-solublebinder for LiNi1/3Co1/3Mn1/3O2 Cathode in Li-ion Batteries", J Solid State Electrochem, vol. 20, Aug. 1, 2015 (Aug. 1, 2015), pp. 1-8.
Request for the Submission of an Opinion received in the corresponding Korean application 10-2023-7038040, mailed Dec. 6, 2023.
Written Decision on Registration received in the corresponding Korean application 10-2023-7038040, mailed Apr. 4, 2024.
Notice of Reasons for Refusal received in the corresponding Japanese application 2023-568164, mailed Dec. 3, 2024.

* cited by examiner

BINDER COMPOSITION AND SEPARATOR CONTAINING SAME

RELATED APPLICATIONS

This application is a continuation of international application PCT/CN2022/121639, filed on Sep. 27, 2022, which is incorporated herein by reference in its entirety.

TECHNICAL FIELD

This application relates to the field of lithium battery technologies, and in particular, to a binder composition and a separator containing the same. This application also relates to a secondary battery, a battery module, a battery pack, and an electric apparatus.

BACKGROUND

In recent years, with the increasingly widespread application of secondary batteries, secondary batteries have been widely used in energy storage power supply systems such as hydroelectric power plants, thermal power plants, wind power plants, and solar power plants, and many other fields including electric tools, electric bicycles, electric motorcycles, electric vehicles, military equipment, and aerospace. Along with the great development of secondary batteries, higher requirements are imposed on their energy density, cycling performance, safety performance, and the like. Binders are commonly used in the separator of the secondary battery. However, existing binders have inadequate viscosity and tend to clog the substrate, resulting in a decrease in the porosity of the separator. This leads to reduced ion mobility within the separator and increased resistance in the separator, thereby affecting the cycling performance of the secondary battery.

SUMMARY

To achieve the above purpose, this application provides a binder composition, a separator containing the same, a secondary battery, a battery pack, and an electric apparatus.

A first aspect of this application provides a binder composition including a polymer and ceramic particles; the polymer including structural units derived from a first-type monomer, a second-type monomer, and a third-type monomer, and a molar ratio of the first-type monomer, second-type monomer, and third-type monomer being (50 to 58):(40 to 44):(2 to 6); where the first-type monomer is selected from one or more compounds of formula I:

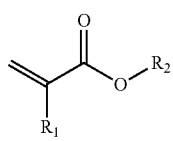

I where $R_1$ is selected from a hydrogen atom and a straight-chain or branched-chain C1-6 alkyl group; and $R_2$ is selected from a substituted or unsubstituted straight-chain or branched-chain C1-15 alkyl group, a C3-6 cycloalkyl group, and an isobornyl group, where in a case of substitution, a substituent is selected from a hydroxyl group and a C1-6 chain alkyl group;

the second-type monomer is selected from one or more compounds of formula II:

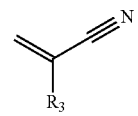

II where $R_3$ is selected from a hydrogen atom and a straight-chain or branched-chain C1-6 alkyl group; and
the third-type monomer is selected from one or more compounds of formula III:

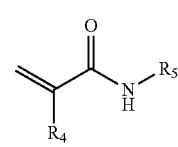

III where $R_4$ is selected from a hydrogen atom and a straight-chain or branched-chain C1-6 alkyl group, and $R_5$ is selected from a hydrogen atom, a hydroxy C1-6 alkyl group, and a C1-6 alkoxy group. The binder composition of this application bonds well and can improve the porosity of the separator, increase the ionic conductivity, and reduce the internal resistance of the separator, thereby enhancing the cycling performance of the secondary battery.

In any embodiment, $R_1$ is selected from a hydrogen atom and a methyl group, and $R_2$ is selected from a substituted or unsubstituted straight-chain or branched-chain C1-6 alkyl group, where in a case of substitution, a substituent is a hydroxyl group; and/or $R_3$ is selected from a hydrogen atom and a methyl group; and/or $R_4$ is selected from a hydrogen atom and a methyl group, and $R_5$ is selected from a hydrogen atom, a hydroxy C1-4 alkyl group, and a C1-4 alkoxy group.

In any embodiment, the first-type monomer is selected from one or more of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate; and/or the second-type monomer is acrylonitrile or methacrylonitrile; and/or the third-type monomer is selected from one or more of acrylamide, N-methylolacrylamide, and N-butoxymethacrylamide.

Further selecting the first-, second-, and/or third-type monomer respectively is helpful to improve the ionic conductivity of the separator and enhance the cycling capacity retention of the battery.

In any embodiment, a molar ratio of the first-type monomer, second-type monomer, and third-type monomer is (50 to 57):(41 to 44):(2 to 6). The use of the molar ratio in the above range is more helpful for the binder composition to further improve the ionic conductivity of the separator and to improve the cycling capacity retention of the battery.

In any embodiment, the polymer and the ceramic particles have a weight ratio of (40 to 90):(10 to 60), optionally (50 to 80):(20 to 50). The weight ratio of the polymer and the ceramic particles being within the above range not only ensures effective adhesion between the binder and the separator and the electrode plate but also gives the separator a proper porosity and a good ionic conductivity.

In any embodiment, the polymer has a weight-average molecular weight of 60,000 to 120,000, optionally 63,300 to 118,800. The weight-average molecular weight of the polymer being within the above range enables the polymer to have proper fluidity in an adhesion process of the binder composition in this application, thereby achieving good adhesion and thus enhancing the cycling performance of the secondary battery.

In any embodiment, the ceramic particles have a median particle size $D_v50$ of 40 nm to 110 nm, optionally 45 nm to 106 nm, more optionally 50 nm to 100 nm, and further more optionally 56 nm to 89 nm. Further controlling the median particle size of the ceramic particles can further improve the ionic conductivity and capacity retention rate.

In any embodiment, the ceramic particles are porous particles, and the porous particles have an average pore size of 0.3 nm to 6.0 nm, optionally 0.5 nm to 5.7 nm, more optionally 1.0 nm to 5.0 nm, and further more optionally 1.3 nm to 3.8 nm. Selecting the porous particle material and controlling its average pore size help to further improve the porosity and ionic conductivity of the separator and the cycling capacity retention of the secondary battery while ensuring the thermal stability of the separator.

In any embodiment, the ceramic particles are porous silica particles. The use of porous silica particles can further improve the porosity and ionic conductivity of the separator and reduce the internal resistance of the separator, thereby enhancing the cycling performance of the secondary battery.

In any embodiment, the polymer is applied to the ceramic particles. This helps to ensure that the binder composition can be uniformly applied to the substrate in a desirable ratio to achieve improved heat resistance, porosity, and good adhesion.

A second aspect of this application provides a separator, the separator including a base layer and a coating layer provided on at least one surface of the base layer, and the coating layer containing the binder composition according to the first aspect of this application. The separator of this application can form stable adhesion with the electrode plate and has improved porosity, increased ionic conductivity, and reduced internal resistance of the separator, thereby enhancing the cycling performance of the secondary battery.

A third aspect of this application provides a secondary battery including the binder composition according to the first aspect of this application and/or the separator according to the second aspect of this application.

A fourth aspect of this application provides a battery module including the secondary battery according to the third aspect of this application.

A fifth aspect of this application provides a battery pack including the battery module in the fourth aspect of this application.

A sixth aspect of this application provides an electric apparatus including at least one of the secondary battery according to the third aspect of this application, the battery module according to the fourth aspect of this application, or the battery pack according to the fifth aspect of this application.

The binder of this application has good adhesion performance and also improves the porosity of the separator and reduces the internal resistance of the separator, thereby enhancing the cycling performance of the secondary battery.

Figure 1:
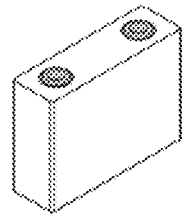
FIG. 1 is a schematic diagram of a secondary battery according to an embodiment of this application.

Reference signs in the accompanying drawings are described as follows:

1. battery pack; 2. upper box body; 3. lower box body; 4. battery module; 5. secondary battery; 51. housing; 52. electrode assembly; and 53. top cover assembly.

DESCRIPTION OF EMBODIMENTS

The following specifically discloses embodiments of a binder composition, a separator, a secondary battery, a battery module, a battery pack, and an electrical apparatus in this application with appropriate reference to detailed descriptions of accompanying drawings. However, there may be cases where unnecessary detailed descriptions are omitted. For example, detailed descriptions of a well-known matter and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed in the order described or in random order, preferably, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

In recent years, with the increasingly widespread application of secondary batteries. secondary batteries have been widely used in energy storage power supply systems such as hydroelectric power plants, thermal power plants, wind power plants, and solar power plants, and many other fields including electric tools, electric bicycles, electric motorcycles, electric vehicles, military equipment, and aerospace. Along with the great development of secondary batteries, higher requirements are imposed on their energy density, cycling performance, safety performance, and the like. As an essential part of secondary batteries, the separator has naturally become one of the focal points for technicians. In existing technologies, a common approach to improve heat resistance and puncture resistance of a separator is to coat a separator substrate with ceramic particles (such as inorganic oxide particles like silica, alumina, or boehmite). Subsequently, a binder is applied to the separator coated with the ceramic particles to bind the separator to the electrode plate, so as to further fabricate the secondary battery. However, this approach has several drawbacks. Firstly, ceramic particles tend to fall into pores of the substrate, reducing the porosity of the separator and impeding ion movement. Secondly, the adhesion effect of the existing binder is inadequate.

To solve the above problems, this application proposes a binder composition including a polymer that plays an adhesion role and ceramic particles that improve safety performance, thereby mitigating and even avoiding pore-clogging issues and achieving effective adhesion. Furthermore, selection of monomers and control of their proportions in the polymer of the binder composition in this application contribute to enhancing ionic conductivity. In summary, the binder composition of this application can improve the porosity of the separator and increase the ionic conductivity, thereby enhancing the cycling performance of the secondary battery.

Binder

In an embodiment of this application, this application proposes a binder composition including a polymer and ceramic particles, the polymer including structural units derived from a first-type monomer, a second-type monomer, and a third-type monomer, and a molar ratio of the first-type monomer, second-type monomer, and third-type monomer being (50 to 58):(40 to 44):(2 to 6); where the first-type monomer is selected from one or more compounds of formula I:

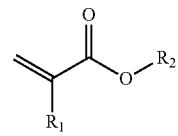

I where $R_1$ is selected from a hydrogen atom and a straight-chain or branched-chain C1-6 alkyl group, and $R_2$ is selected from a substituted or unsubstituted straight-chain or branched-chain C1-15 alkyl group, a C3-6 cycloalkyl group, and an isobornyl group, where in a case of substitution, a substituent is selected from a hydroxyl group and a C1-6 chain alkyl group;

the second-type monomer is selected from one or more compounds of formula II:

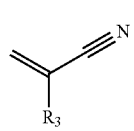

II where $R_3$ is selected from a hydrogen atom and a straight-chain or branched-chain C1-6 alkyl group; and the third-type monomer is selected from one or more compounds of formula III:

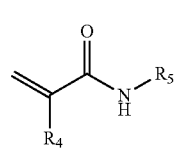

III where $R_4$ is selected from a hydrogen atom and a straight-chain or branched-chain C1-6 alkyl group, and $R_5$ is selected from a hydrogen atom, a hydroxy C1-6 alkyl group, and a C1-6 alkoxy group.

The binder composition of this application bonds well and can improve the porosity of the separator, increase the ionic conductivity, and reduce the internal resistance of the separator, thereby enhancing the cycling performance of the secondary battery.

In the polymer of this application, the first-type monomer is an acrylate monomer, which can improve the swelling resistance of the binder and can regulate the glass transition temperature of the polymer as a flexible monomer chain segment in the molecular chain segment, thus contributing to the effective adhesion of the binder composition. The second-type monomer is an acrylonitrile monomer, which contains a highly polar cyano group that contributes to the ionic conductivity. The third-type monomer is an acrylamide monomer, in which the amide group mainly acts as a cross-link to facilitate control of the polymer molecular weight. The molar ratio of the above three types of monomers needs to be controlled within a given range to ensure that the polymer has a desirable molecular weight and glass transition temperature, thus helping to improve the ionic conductivity while ensuring the adhesion performance of the binder.

In some embodiments, $R_1$ is selected from a hydrogen atom and a methyl group, and $R_2$ is selected from a substituted or unsubstituted straight-chain or branched-chain C1-6 alkyl group, where in a case of substitution, a substituent is a hydroxyl group. In some embodiments, $R_3$ is selected from a hydrogen atom and a methyl group. In some embodiments, $R_4$ is selected from a hydrogen atom and a methyl group, and $R_5$ is selected from a hydrogen atom, a hydroxy C1-4 alkyl group, and a C1-4 alkoxy group.

In some embodiments, the first-type monomer is selected from one or more of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate. In some embodiments, the second-type monomer is acrylonitrile or methacrylonitrile. In some embodiments, the third-type monomer is selected from one or more of acrylamide, N-methylolacrylamide, and N-butoxymethacrylamide.

Further selecting the first-, second-, and/or third-type monomer respectively is helpful to improve the ionic conductivity of the separator and enhance the cycling capacity retention of the battery.

In some embodiments, a molar ratio of the first-type monomer, second-type monomer, and third-type monomer is (50 to 57):(41 to 44):(2 to 6). The use of the molar ratio in the above range is more helpful for the binder composition to further improve the ionic conductivity of the separator and to improve the cycling capacity retention of the battery.

In some embodiments, based on a total molar mass of the first-type monomer, the second-type monomer, and the third-type monomer, a molar percentage of the first-type monomer is 50-58 mol %, optionally 50-57 mol %; and optionally, the molar percentage of the first-type monomer is 50 mol %, 51 mol %, 52 mol %, 53 mol %, 54 mol % 55 mol %, 56 mol %, 57 mol %, or 58 mol %, or within a range formed by any two of the above values. In some embodiments, based on a total molar mass of the first-type monomer, the second-type monomer, and the third-type monomer, a molar percentage of the second-type monomer is 40-44 mol %, optionally 41-44 mol %; and optionally, the molar percentage of the second-type monomer is 40 mol %, 41 mol %, 42 mol %, 43 mol %, or 44 mol %, or within a range formed by any two of the above values. In some embodiments, based on a total molar mass of the first-type monomer, the second-type monomer, and the third-type monomer, a molar percentage of the third-type monomer is 2-6 mol %; and optionally, the molar percentage of the third-type monomer is 2 mol %, 3 mol %, 4 mol %, 5 mol %, or 6 mol %, or within a range formed by any two of these values.

In some embodiments, the polymer and the ceramic particles have a weight ratio of (40 to 90):(10 to 60), optionally (50 to 80):(20 to 50). The weight ratio of the polymer and the ceramic particles being within the above range not only ensures effective adhesion between the binder and the separator and the electrode plate but also gives the separator a proper porosity and a good ionic conductivity.

In some embodiments, the polymer has a weight-average molecular weight of 60,000 to 120,000, optionally 63,300 to 118,800. The weight-average molecular weight of the polymer being within the above range enables the polymer to have proper fluidity in an adhesion process of the binder composition in this application, thereby achieving good adhesion and thus enhancing the cycling performance of the secondary battery.

In some embodiments, the ceramic particles have a median particle size $D_v50$ of 40 nm to 110 nm, optionally 45 nm to 106 nm; and optionally, the ceramic particles have a median particle size $D_v50$ of 40 nm, 45 nm, 50 nm, 56 nm, 70 nm, 89 nm, 100 nm, 106 nm, or 110 nm, or within a range formed by any two of these values. Optionally, the ceramic particles have a median particle size $D_v50$ of 50 nm to 100 nm, more optionally 56 nm to 89 nm. Further controlling the median particle size of the ceramic particles can further improve the ionic conductivity and capacity retention rate.

The material of the ceramic particles in this application may be any suitable conventional material in the art. In some embodiments, the ceramic particles are selected from alumina, boehmite, titanium dioxide, and silica.

In some embodiments, the ceramic particles may be porous particles or solid particles (that is, non-porous particles). In some embodiments, the ceramic particles are porous particles. The porous particles have an average pore size of 0.3 nm to 6.0 nm; optionally, the average pore size is 0.5 nm, 1 nm, 1.3 nm, 3 nm, 3.8 nm, 5 nm, or 5.7 nm, or within a range formed by any two of these values. Optionally, the average pore size is 0.5 nm to 5.7 nm, more optionally 1.0 nm to 5.0 nm, and further more optionally 1.3 nm to 3.8 nm. Further selecting the porous particle materials and preferably controlling their average pore size are helpful to further improve the porosity and ionic conductivity of the separator and the cycling capacity retention of the secondary battery while ensuring the thermal stability of the separator.

In some embodiments, the ceramic particles are porous silica particles. The use of porous silica particles can further improve the porosity and ionic conductivity of the separator and reduce the internal resistance of the separator, thereby enhancing the cycling performance of the secondary battery.

In some embodiments, the polymer is applied to the ceramic particles. Before use, the polymer is applied to the ceramic particles to reduce or prevent particles from falling into the pores of the separator and causing clogging, and to ensure that the polymer and ceramic particles can be uniformly applied to the substrate in a desirable ratio to achieve improved heat resistance, porosity, and good adhesion. In some embodiments, the polymer is applied to the porous silica particles.

Separator

Another aspect of this application provides a separator, the separator including a base layer and a coating layer provided on at least one surface of the base layer, the coating layer including the binder of this application.

The separator base layer is not particularly limited to a specific type of material in this application and may be any well-known porous base layer with good chemical and mechanical stability.

In some embodiments, the material of the separator base layer may be selected from at least one of glass fiber, nonwoven, polyethylene, polypropylene, and polyvinylidene fluoride. The separator may be a single-layer film or a multi-layer composite film and is not particularly limited. When the separator is a multi-layer composite film, all layers may be made of same or different materials, which is not particularly limited.

Secondary Battery, Battery Module, Battery Pack, and Electric Apparatus

A third aspect of this application provides a secondary battery including the binder of this application, and/or the separator of this application.

A fourth aspect of this application provides a battery module including the secondary battery according to the third aspect.

A fifth aspect of this application provides a battery pack including the battery module according to the fourth aspect.

A sixth aspect of this application provides an electric apparatus including at least one selected from the secondary battery according to the third aspect, the battery module according to the fourth aspect, and the battery pack according to the fifth aspect.

In addition, the following describes a secondary battery, a battery module, a battery pack, and an electric apparatus in this application with appropriate reference to the accompanying drawings.

An embodiment of this application provides a secondary battery. In some embodiments, the secondary battery is a lithium-ion secondary battery.

Normally, the secondary battery includes a positive electrode plate, a negative electrode plate, an electrolyte, and a separator. In a charge and discharge process of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent a short circuit between positive and negative electrodes and to allow the ions to pass through.

[Positive Electrode Plate]

The positive electrode plate includes a positive electrode current collector and a positive electrode film layer disposed on at least one surface of the positive electrode current collector, where the positive electrode film layer includes the binder composition according to the first aspect of this application.

For example, the positive electrode current collector includes two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the positive electrode active material may be a positive electrode active material for batteries well-known in the art. For example, the positive electrode active material may include at least one of the following materials: a lithium-containing phosphate of olivine structure, a lithium transition metal oxide, and respective modified compounds thereof, a sodium transition metal oxide, a polyanionic compound, and a Prussian blue compound. However, this application is not limited to such materials, and may alternatively use other conventional well-known materials that can be used as positive electrode active materials for batteries. One type of these positive electrode active materials may be used alone, or two or more of them may be used in combination. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (NCM333 for short), $LiNi_{0.5}Co_{0.2}Mn_{0.3}O_2$(NCM523 for short), $LiNi_{0.5}Co_{0.25}Mn_{0.25}O_2$(NCM211 for short), $LiNi_{0.6}Co_{0.2}Mn_{0.2}O_2$(NCM622 for short), and $LiNi_{0.8}Co_{0.1}Mn_{0.1}O_2$(NCM811 for short), lithium nickel cobalt aluminum oxide (for example, $LiNi_{0.85}Co_{0.15}Al_{0.05}O_2$), and modified compounds thereof. Examples of the olivine-structured lithium-containing phosphate may include but are not limited to at least one of lithium iron phosphate (for example, $LiFePO_4$ (LFP for short)), a composite material of lithium iron phosphate and carbon, lithium manganese phosphate (for example, $LiMnPO_4$), composite materials of lithium manganese phosphate and carbon, lithium manganese iron phosphate, and composite materials of lithium manganese iron phosphate and carbon.

In some embodiments, a transition metal in the sodium transition metal oxide may be at least one of Mn, Fe, Ni, Co, Cr, Cu, Ti, Zn, V, Zr, and Ce. The sodium transition metal oxide is, for example, $Na_xM_yO_2$, where M is one or more of Ti, V, Mn, Co, Ni, Fe, Cr, and Cu, $0<x\le1$, and $0.5<y\le1.5$. In some embodiments, the positive electrode active material may be $Na_{0.88}Cu_{0.24}Fe_{0.29}Mn_{0.47}O_2$.

In some embodiments, the polyanionic compound may be a class of compound having sodium ions, transition metal ions, and tetrahedral-type $(YO_4)^{n-}$ anionic units. The transition metal may be at least one of Mn, Fe, Ni, Co, Cr, Cu, Ti, Zn, V, Zr, and Ce; Y may be at least one of P, S, and Si; and n denotes a valence state of $(YO_4)^{n-}$.

In some embodiments, the polyanionic compound may alternatively be a class of compound having a sodium ion, a transition metal ion, a tetrahedral type $(YO_4)^{n-}$ anion unit, and a halogen anion. The transition metal may be at least one of Mn, Fe, Ni, Co, Cr, Cu, Ti, Zn, V, Zr, and Ce; Y may be at least one of P, S, and Si, and n denotes a valence state of $(YO_4)^{n-}$; and the halogen may be at least one of F, Cl, and Br.

In some embodiments, the polyanionic compound may alternatively be a class of compound having a sodium ion, a tetrahedral type $(YO_4)^{n-}$ anionic unit, a polyhedral unit $(ZO_y)^{m+}$, and a selectable halogen anion. Y may be at least one of P, S, and Si, and n denotes a valence state of $(YO_4)^{n-}$; Z denotes a transition metal and may be at least one of Mn, Fe, Ni, Co, Cr, Cu, Ti, Zn, V, Zr, and Ce, and m denotes a valence state of $(ZO_y)^{m+}$; and the halogen may be at least one of F, Cl, and Br.

In some embodiments, the polyanionic compound is, for example, at least one of $NaFePO_4$, $Na_3V_2(PO_4)_3$, $NaM'PO_4F$ (M' is one or more of V, Fe, Mn, and Ni), and $Na_3(VO_y)_2(PO_4)_2F_{3-2y}$ ($0\le y\le1$).

In some embodiments, the Prussian blue compound may be a type of compounds having sodium ions, transition metal ions, and cyanide ions ($CN^-$). The transition metal may be at least one of Mn, Fe, Ni, Co, Cr, Cu, Ti, Zn, V, Zr, and Ce. The Prussian blue compound is, for example, $Na_aMe_bMe'_c$ $(CN)_6$, where Me and Me' are each independently at least one of Ni, Cu, Fe, Mn, Co, and Zn, $0<a\leq 2$, $0<b<1$, and $0<c<1$.

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofiber.

In some embodiments, the positive electrode plate may be prepared in the following manner: the foregoing constituents used for preparing the positive electrode plate, for example, the positive electrode active material, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, for the metal foil, a copper foil may be used. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for a battery in the art. For example, the negative electrode active material may include at least one of the following materials: artificial graphite, natural graphite, soft carbon, hard carbon, silicon-based material, tin-based material, and lithium titanate, among others. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials but may use other conventional materials that can be used as negative electrode active materials for batteries instead. One type of these negative electrode active materials may be used alone, or two or more of them may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofiber.

In some embodiments, the negative electrode film layer may further optionally include other promoters such as a thickener (for example, sodium carboxymethyl cellulose (CMC-Na)).

In some embodiments, the negative electrode plate may be prepared in the following manner: the constituents used for preparing the negative electrode plate, for example, the negative electrode active material, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

[Electrolyte]

The electrolyte conducts ions between the positive electrode plate and the negative electrode plate. The electrolyte is not specifically limited to any particular type in this application and may be selected based on needs. For example, the electrolyte may be in a liquid state, a gel state, or an all-solid state.

In some embodiments, the electrolyte is a liquid electrolyte. The liquid electrolyte includes an electrolytic salt and a solvent.

In some embodiments, the electrolytic salt may be selected from one or more of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium borate difluoroxalate, lithium difluorodoxalate, and lithium tetrafluoroxalate, sodium hexafluorophosphate ($NaPF_6$), sodium hexafluoroborate ($NaBF_4$), $NaN(SO_2F)_2$ (abbreviated as NaFSI), $NaClO_4$, $NaAsF_6$, $NaB(C_2O_4)_2$ (abbreviated as NaBOB), $NaBF_2(C_2O_4)$ (abbreviated as NaDFOB), $NaN(SO_2R_F)_2$, and $NaN(SO_2F)(SO_2R_F)$; where $R_F$ represents $C_bF_{2b+1}$, with b being an integer in the range 1-10, optionally an integer in the range 1-3, and more optionally, $R_F$ being $-CF_3$, $-C_2F_5$, or $-CF_2CF_2CF_3$.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the liquid electrolyte further optionally includes an additive. For example, the additives may include negative electrode film-forming additives and positive electrode film-forming additives, and may also include additives that can improve certain properties of the battery, such as additives that improve the overcharge performance of the battery, additives that improve the high- or low-temperature performance of the battery, and the like.

In some embodiments, the positive electrode plate, the negative electrode plate, and the separator may be made into an electrode assembly through winding or lamination.

[Outer Package]

In some embodiments, the secondary battery may include an outer package for packaging the positive electrode plate, the negative electrode plate, and an electrolyte. In an example, the positive electrode plate, the negative electrode plate, and the separator may be stacked or wound to form a battery cell of a stacked structure or to form a battery cell of a wound structure, which is then packaged in an outer package. The electrolyte is the electrolyte described in the first aspect of this application, and the electrolyte infiltrates into the cell. There may be one or more battery cells in the secondary battery, and the quantity can be adjusted based on needs.

In an embodiment, this application provides an electrode assembly. In some embodiments, the positive electrode plate, the negative electrode plate, and the separator may be made into an electrode assembly through winding or lamination. The outer package may be used for packaging the above electrode assembly and electrolyte.

In some embodiments, the outer package of the secondary battery may be a soft pack, for example, a soft pouch. A material of the soft pack may be plastic, for example, may include one or more of polypropylene (PP), polybutylene terephthalate (PBT), polybutylene succinate (PBS), and the like. In some embodiments, the outer package of the secondary battery may be a hard shell, for example, a hard plastic shell, an aluminum shell, or a steel shell.

This application does not impose any special limitations on a shape of the secondary battery, and the secondary battery may be cylindrical, rectangular, or of any other shapes. For example, FIG. 1 shows a secondary battery 5 of a rectangular structure as an example.

Figure 2:
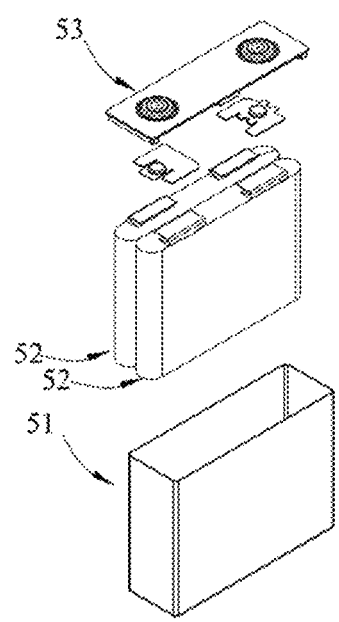
FIG. 2 is an exploded view of the secondary battery according to the embodiment of this application in FIG. 1.

In some embodiments, referring to FIG. 2, the outer package may include a housing 51 and a cover plate 53. The housing 51 may include a bottom plate and a side plate attached to the bottom plate, and the bottom plate and the side plate enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the secondary battery 5, and persons skilled in the art may make choices according to actual requirements.

In some embodiments, the secondary battery may be assembled into a battery module, and the battery module may include one or more secondary batteries. The specific quantity may be chosen by persons skilled in the art according to the use and capacity of the battery module.

Figure 3:
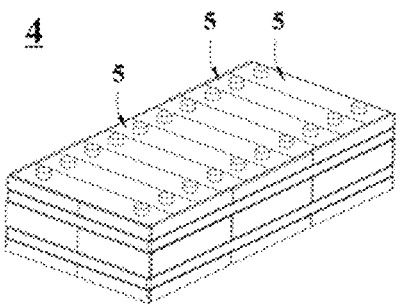
FIG. 3 is a schematic diagram of a battery module according to an embodiment of this application.

FIG. 3 shows a battery module 4 as an example. Referring to FIG. 3, in the battery module 4, a plurality of secondary batteries 5 may be arranged sequentially along a length direction of the battery module 4. Certainly, the batteries may alternatively be arranged in any other manner. Further, the plurality of secondary batteries 5 may be secured by fasteners.

Optionally, the battery module 4 may further include a housing with accommodating space, and the plurality of secondary batteries 5 are accommodated in the accommodating space.

In some embodiments, the battery module may be further assembled into a battery pack, and the battery pack may include one or more battery modules. The specific quantity may be chosen by persons skilled in the art according to the use and capacity of the battery pack.

Figure 4:
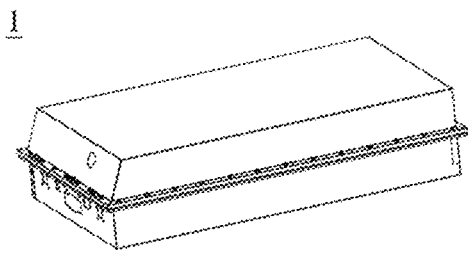
FIG. 4 is a schematic diagram of a battery pack according to an embodiment of this application.
Figure 5:
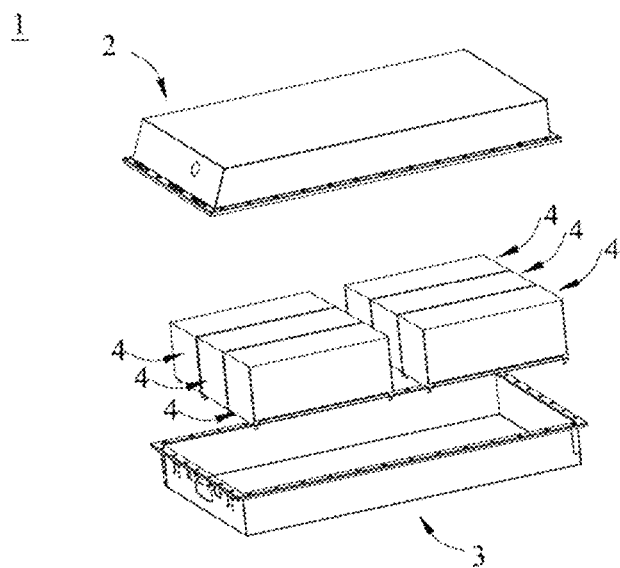
FIG. 5 is an exploded view of the battery pack according to an embodiment of this application in FIG. 4.

FIG. 4 and FIG. 5 show a battery pack 1 as an example. Referring to FIGS. 4 and 5, the battery pack 1 may include a battery box and a plurality of battery modules 4 provided in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

The secondary battery, the battery module, or the battery pack may be selected for the electric apparatus based on requirements for using the electric apparatus.

Figure 6:
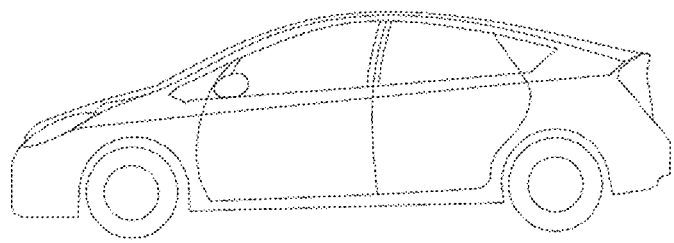
FIG. 6 is a schematic diagram of an electric apparatus using a secondary battery as a power source according to an embodiment of this application.

FIG. 6 shows an electric apparatus as an example. This electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the apparatus may be a mobile phone, a tablet computer, a notebook computer, or the like. Such apparatus is usually required to be light and thin and may use a secondary battery as a power source.

EXAMPLES

The following describes examples of this application. The examples described below are illustrative and only used for explaining this application, and cannot be construed as limitations on this application. Examples whose technical solutions or conditions are not specified are made in accordance with technical solutions or conditions described in literature in the field or made in accordance with product instructions. The reagents or instruments used are all conventional products that are commercially available if no manufacturer is indicated.

1. Preparation of Polymer

Preparation Example 1

At room temperature, 60.92 g of methyl acrylate, 33.04 g of acrylonitrile, and 6.04 g of acrylamide were weighed according to a molar ratio of 50:44:6. They were then added to a 500 mL four-necked flask equipped with a mechanical stirrer, a thermometer, and a condenser tube. Next, 3 g of sodium dodecyl sulfate emulsifier, 1 g of ammonium persulfate initiator, and 120 g of deionized water were added, and the mixture was stirred for 30 min at 1600 rpm to achieve emulsification. Subsequently, the temperature was raised to 75° C. under nitrogen protection, and the reaction proceeded for 4 h. The pH value was adjusted to a range of 6 to 8. After that, the reaction mixture was immediately cooled to below 40° C. and discharged, resulting in the formation of polymer 1.

Preparation Examples 2 to 5

The preparation steps of preparation examples 2 to 5 were the same as those in preparation example 1, except that the molar ratio of the three types of monomers was 51:43:6, 52:42:6, 53:41:6, and 54:40:6, the total mass of the three types of monomers was 100 g, and polymers 2 to 5 was prepared, respectively.

Preparation Examples 6 to 10

In preparation example 6, at room temperature, 69.71 g of n-butyl acrylate, 24.90 g of acrylonitrile, and 5.39 g of N-methylolacrylamide were weighed according to a molar ratio of 51:44:5. The remaining steps were the same as those in preparation example 1. Polymer 6 was prepared.

In preparation examples 7 to 10, the molar ratio of the above three types of monomers was 52:43:5, 53:42:5, 54:41:5, and 55:40:5, respectively, and the total mass of the three types of monomers was 100 g. The remaining steps were the same as those in preparation example 1. Polymers 7 to 10 were prepared, respectively.

Preparation Examples 11 to 15

In preparation example 11, at room temperature, 68.42 g of ethyl methacrylate, 26.91 g of acrylonitrile, and 4.66 g of N-methylolacrylamide were weighed according to a molar ratio of 52:44:4. The remaining steps were the same as those in preparation example 1. Polymer 11 was prepared.

In preparation examples 12 to 15, the molar ratio of the above three types of monomers was 53:43:4, 54:42:4, 55:41:4, and 56:40:4, respectively, and the total mass of the three types of monomers was 100 g. The remaining steps were the same as those in preparation example 1. Polymers 12 to 15 were prepared, respectively.

Preparation Examples 16 to 20

In preparation example 16, at room temperature, 67.94 g of 2-hydroxyethyl methacrylate, 29.08 g of methacrylonitrile, and 2.99 g of N-butoxymethacrylamide were weighed according to a molar ratio of 53:44:3. The remaining steps were the same as those in preparation example 1. Polymer 16 was prepared.

In preparation examples 17 to 20, the molar ratio of the above three types of monomers was 54:43:3, 55:42:3, 56:41:3, and 57:40:3, respectively, and the total mass of the three types of monomers was 100 g. The remaining preparation steps were the same as those in preparation example 1. Polymers 17 to 20 were prepared, respectively.

Preparation Examples 21 to 25

In preparation example 21, at room temperature, 70.44 g of 2-hydroxypropyl methacrylate, 26.71 g of methacrylonitrile, and 2.85 g of N-butoxymethacrylamide were weighed according to a molar ratio of 54:44:2. The remaining preparation steps were the same as those in preparation example 1. Polymer 21 was prepared.

In preparation examples 22 to 25, the molar ratio of the above three types of monomers was 55:43:2, 56:42:2, 57:41:2, and 58:40:2, respectively, and the total mass of the three types of monomers was 100 g. The remaining preparation steps were the same as those in preparation example 1. Polymers 22 to 25 were prepared, respectively.

Preparation Example 26

In preparation example 26, at room temperature, 75.13 g of cyclohexyl acrylate, 20.88 g of acrylonitrile, and 4.00 g of acrylamide were weighed according to a molar ratio of 52:42:6. The remaining preparation steps were the same as those in preparation example 1. Polymer 26 was prepared.

Preparation Example 27

In preparation example 27, at room temperature, 80.07 g of isobornyl methacrylate, 16.95 g of methacrylonitrile, and 2.98 g of N-butoxymethacrylamide were weighed according to a molar ratio of 57:40:3. The remaining preparation steps were the same as those in preparation example 1. Polymer 27 was prepared.

Comparative Preparation Example 1

At room temperature, 69.50 g of methyl acrylate, 22.85 g of acrylonitrile, and 7.65 g of acrylamide were weighed according to a molar ratio of 60:32:8. The remaining preparation steps were the same as those in preparation example 1. Polymer C1 was prepared.

Comparative Preparation Example 2

At room temperature, 74.42 g of 2-hydroxyethyl methacrylate and 25.58 g of methacrylonitrile were weighed according to a molar ratio of 60:40. The remaining steps were the same as those in example 1. Polymer C2 is prepared.

The weight-average molecular weights of polymers 1 to 27 and comparative polymers 1 and 2 obtained from the above preparation examples and comparative preparation examples were determined using a Waters 1515 gel permeation chromatograph; where the mobile phase was N,N-dimethylformamide, the standard sample was a linear polymethyl methacrylate polymer with a narrow molecular weight distribution, and the solvent flow rate was 1.0 ml/min.

Table 1 shows the monomers and their molar ratios in the above preparation examples 1 to 27 and comparative preparation examples 1 to 2, as well as the weight-average molecular weights of the final polymers obtained.

TABLE 1

| No. | First-type monomer | Second-type monomer | Third-type monomer | Molar ratio | Weight-average molecular weight |
|---|---|---|---|---|---|
| Preparation example 1 | Methyl acrylate | Acrylonitrile | Acrylamide | 50:44:6 | 63,300 |
| Preparation example 2 | Methyl acrylate | Acrylonitrile | Acrylamide | 51:43:6 | 64,100 |
| Preparation example 3 | Methyl acrylate | Acrylonitrile | Acrylamide | 52:42:6 | 74,500 |
| Preparation example 4 | Methyl acrylate | Acrylonitrile | Acrylamide | 53:41:6 | 79,300 |
| Preparation example 5 | Methyl acrylate | Acrylonitrile | Acrylamide | 54:40:6 | 87,100 |
| Preparation example 6 | n-butyl acrylate | Acrylonitrile | N-methylolacrylamide | 51:44:5 | 76,200 |
| Preparation example 7 | n-butyl acrylate | Acrylonitrile | N-methylolacrylamide | 52:43:5 | 80,200 |
| Preparation example 8 | n-butyl acrylate | Acrylonitrile | N-methylolacrylamide | 53:42:5 | 87,800 |
| Preparation example 9 | n-butyl acrylate | Acrylonitrile | N-methylolacrylamide | 54:41:5 | 90,100 |
| Preparation example 10 | n-butyl acrylate | Acrylonitrile | N-methylolacrylamide | 55:40:5 | 91,600 |
| Preparation example 11 | Ethyl methacrylate | Acrylonitrile | N-methylolacrylamide | 52:44:4 | 90,500 |
| Preparation example 12 | Ethyl methacrylate | Acrylonitrile | N-methylolacrylamide | 53:43:4 | 101,200 |
| Preparation example 13 | Ethyl methacrylate | Acrylonitrile | N-methylolacrylamide | 54:42:4 | 102,900 |
| Preparation example 14 | Ethyl methacrylate | Acrylonitrile | N-methylolacrylamide | 55:41:4 | 110,500 |
| Preparation example 15 | Ethyl methacrylate | Acrylonitrile | N-methylolacrylamide | 56:40:4 | 115,000 |
| Preparation example 16 | 2-hydroxyethyl methacrylate | Methacrylonitrile | N-butoxymethacrylamide | 53:44:3 | 90,600 |
| Preparation example 17 | 2-hydroxyethyl methacrylate | Methacrylonitrile | N-butoxymethacrylamide | 54:43:3 | 100,500 |
| Preparation example 18 | 2-hydroxyethyl methacrylate | Methacrylonitrile | N-butoxymethacrylamide | 55:42:3 | 103,900 |
| Preparation example 19 | 2-hydroxyethyl methacrylate | Methacrylonitrile | N-butoxymethacrylamide | 56:41:3 | 110,300 |
| Preparation example 20 | 2-hydroxyethyl methacrylate | Methacrylonitrile | N-butoxymethacrylamide | 57:40:3 | 115,000 |
| Preparation example 21 | 2-hydroxypropyl methacrylate | Methacrylonitrile | N-butoxymethacrylamide | 54:44:2 | 85,600 |
| Preparation example 22 | 2-hydroxypropyl methacrylate | Methacrylonitrile | N-butoxymethacrylamide | 55:43:2 | 93,700 |
| Preparation example 23 | 2-hydroxypropyl methacrylate | Methacrylonitrile | N-butoxymethacrylamide | 56:42:2 | 100,300 |
| Preparation example 24 | 2-hydroxypropyl methacrylate | Methacrylonitrile | N-butoxymethacrylamide | 57:41:2 | 110,300 |
| Preparation example 25 | 2-hydroxypropyl methacrylate | Methacrylonitrile | N-butoxymethacrylamide | 58:40:2 | 118,800 |
| Preparation example 26 | Cyclohexyl acrylate | Acrylonitrile | Acrylamide | 52:42:6 | 84,300 |
| Preparation example 27 | Isobornyl methacrylate | Methacrylonitrile | N-butoxymethacrylamide | 57:40:3 | 116,500 |
| Comparative preparation example 1 | Methyl acrylate | Acrylonitrile | Acrylamide | 60:32:8 | 125,500 |
| Comparative preparation example 2 | 2-hydroxyethyl methacrylate | Methacrylonitrile | — | 60:40:0 | 58,400 |

In this application, the ceramic particles in the following examples are commercially available. The median particle size $D_v50$ of the ceramic particles was determined using a laser particle size analyzer (using deionized water as a dispersant); and the average pore size of the ceramic particles was determined using the gas adsorption-desorption isotherm method. The median particle size and average pore size are shown in table 2 below.

Example 1

1. Preparation of Binder Composition

According to a mass ratio 75:25 of polymer to porous silica particles, 250 g of porous silica particles and 1 kg of deionized water were added to 750 g of polymer 1 obtained from preparation example 1. The mixture was stirred for 1 hour at room temperature, and then subjected to spray drying such that the polymer is uniformly applied to the surface of the porous silica particles. Subsequently, the particles were subjected to ball milling, resulting in the desired binder composition of this application. The median particle size $D_v50$ of the porous silica particles used above was 70 nm, with an average pore size of 2.5 nm, as shown in table 2.

2. Preparation of Separator

Commercially available PP-PE copolymer microporous film with a thickness of 20 μm and an average pore size of 80 nm (from Advanced Electronic Technology Company, model 20) was used as the substrate. The binder composition prepared as above was mixed evenly in N-Methylpyrrolidone (NMP) to obtain a slurry (with a solid content of 20%). The slurry was evenly applied to both surfaces of the substrate and then dried to remove the organic solvent. Subsequently, the binder composition was applied to the substrate with a coating density of 0.5 g/m² to obtain the separator.

3. Preparation of Positive Electrode Plate

Polyvinylidene fluoride (PVDF), lithium iron phosphate (LFP), conductive agent carbon black, and N-methylpyrrolidone (NMP) were mixed in a mass ratio of 1.2:58.38:0.42:40. After thorough stirring and mixing, the uniform positive electrode slurry was prepared. This positive electrode slurry was evenly applied to one surface of the positive electrode current collector aluminum foil with a loading amount of 200 g/m², followed by drying, cold pressing, and slitting, to obtain the positive electrode plate.

4. Preparation of Negative Electrode Plate

Artificial graphite, conductive agent acetylene black, binder styrene-butadiene rubber (SBR), and thickener sodium carboxymethyl cellulose (CMC-Na) are added into deionized water according to a mass ratio of 96.2:1.0:1.6:1.2, and after thorough stirring and mixing, the uniform negative electrode slurry (with a solid content of 63%) was prepared. This negative electrode slurry was applied to one surface of the negative electrode current collector copper foil with a loading amount of 98 g/m², followed by drying, cold pressing, and splitting, to obtain the negative electrode plate.

5. Preparation of Electrolyte

At a temperature of 25° C., ethylene carbonate (EC), ethyl methyl carbonate (EMC), and diethyl carbonate (DEC) were mixed according to a volume ratio of 1:1:1 to obtain a mixed solvent. Then, $LiPF_6$ was dissolved in the above mixed solvent to obtain the electrolyte, where the concentration of $LiPF_6$ was 1 mol/L.

6. Preparation of Secondary Battery

The above positive electrode plate, separator, and negative electrode plate were stacked in order and wound, followed by pre-pressing molding (in this process, adhesion occurs between the separator and the electrode plates) to obtain the electrode assembly. The electrode assembly was put into an outer package, the electrolyte prepared above was injected, and steps such as sealing, standing, formation, and aging were performed to obtain the secondary battery.

Example 2

As shown in table 2 below, according to a mass ratio 60:40 of the polymer to silicon dioxide, 400 g of porous silica particles and 1 kg of deionized water were added to 600 g of polymer 11 obtained in example 11. The mixture was stirred for 1 hour at room temperature, and then subjected to spray drying and ball milling so that the polymer is uniformly applied onto the surface of the porous silica particles, resulting in the binder composition. The median particle size of the porous silica particles was 80 nm, with an average pore size of 3.0 nm. The remaining steps were the same as those in example 1.

Examples 3 to 5

Except that the polymers were polymer 24 obtained in example 24, polymer 26 obtained in example 26, and polymer 27 obtained in example 27, respectively, the remaining steps of examples 3 to 5 were the same as those in example 1.

Examples 6 to 11

Except that the median particle size of the porous silica particles was changed to 45 nm, 50 nm, 56 nm, 89 nm, 100 nm, and 106 nm, respectively, the remaining steps of examples 6 to 11 were the same as those in example 1.

Examples 12 to 17

Except that the average pore size of the porous silica particles was changed to 0.5 nm, 1 nm, 1.3 nm, 3.8 nm, 5 nm, and 5.7 nm, respectively, the remaining steps of examples 12 to 17 were the same as those in example 2.

Examples 18 to 21

Except that the mass ratio of polymer to porous silica particles was changed to 40:60, 50:50, 75:25, 80:20, and 90:10, respectively, the remaining steps of examples 18 to 21 were the same as those in example 3.

Examples 22 to 27

Except that the porous silica particles were changed to solid (non-porous) silica particles of different particle sizes, the remaining steps of examples 22 to 27 were the same as those in example 1.

Comparative Examples 1 and 2

Except that the polymer was changed from preparation example 1 to comparative preparation example 1 and comparative preparation example 2, the remaining steps of comparative examples 1 and 2 were the same as those in example 1.

Comparative Examples 3 and 4

Except that the polymer was changed from preparation example 11 to comparative preparation example 1 and comparative preparation example 2, the remaining steps of comparative examples 3 and 4 were the same as those in example 2.

Comparative Example 5

Except that the polymer was changed from preparation example 1 to comparative preparation example C1 and the particles were changed from porous particles to solid (non-porous) particles with the same median particle size, the remaining steps of comparative example 5 were the same as those in example 1.

Test Method:

1. Separator Ionic Conductivity Testing (1) Preparation of 2025 button cell for testing: In a vacuum glove box, a lithium plate was put into a negative electrode housing of battery. Then, 150 μL of the above electrolyte was added to the housing. Next, the above prepared separator (with an area of 3.14 cm² and a thickness of 12 μm) was placed in close contact with the lithium plate, and an additional 25 μL of the above electrolyte was then added. Finally, the above positive electrode plate was placed on top, followed by sealing. The assembled button cell was removed from the vacuum glove box and left standing for 24 h for the next step of testing.

(2) Testing: At an electrochemical workstation, testing was performed in a frequency range of $10^{-1}$ Hz to $10^6$ Hz to obtain the separator resistance Rb, and the ionic conductivity σ (in the unit of $S \cdot cm^{-1}$) was calculated according to the following equation:

$$\sigma = \frac{L}{Rb \times S}$$

where Rb is an intrinsic resistance of the separator, and L and S are the thickness and area of the separator under test, respectively.

2. Battery Cycling Performance/Capacity Retention Testing

Taking example 1 as an example, the battery capacity retention rate testing procedure is as follows: at 25° C., the battery prepared in example 1 was charged to 4.3 V at a constant current of ⅓ C, then charged to 0.05 C at a constant voltage of 4.3 V, left standing for 5 min, and then discharged to 2.8 V at ⅓ C, and a resulting discharge capacity was recorded as an initial capacity $C_0$. The above steps were repeated for the same battery and a discharge capacity $C_n$ of the battery after the n-th cycle was recorded. A battery capacity retention rate after each cycle was $Pn = C_n/C_0 * 10000$. That is, the battery capacity retention rate after a specified number of cycles can be used to reflect the difference in cycling performance.

The battery capacity retention data corresponding to example 1 in table 2 was measured after 100 cycles under the above test conditions. The test procedure in the comparative examples and other examples were the same as above.

For the results of the above tests, refer to table 2.

TABLE 2

| No. | Polymer | Silicon dioxide nanoparticles | | Polymer-to-particle mass ratio | Separator ionic conductivity $mS \cdot cm^{-1}$ | Capacity retention % |
|---|---|---|---|---|---|---|
| | | Median particle size (nm) | Average pore size (nm) | | | |
| Example 1 | 1 | 70 | 2.5 | 75:25 | 5.86 | 98 |
| Example 2 | 11 | 80 | 3 | 60:40 | 5.71 | 97 |
| Example 3 | 24 | 70 | 2.5 | 75:25 | 5.27 | 97 |
| Example 4 | 26 | 70 | 2.5 | 75:25 | 5.01 | 97 |
| Example 5 | 27 | 70 | 2.5 | 75:25 | 4.82 | 96 |
| Example 6 | 1 | 45 | 2.5 | 75:25 | 3.52 | 94 |
| Example 7 | 1 | 50 | 2.5 | 75:25 | 4.39 | 95 |
| Example 8 | 1 | 56 | 2.5 | 75:25 | 4.87 | 96 |
| Example 9 | 1 | 89 | 2.5 | 75:25 | 4.64 | 97 |
| Example 10 | 1 | 100 | 2.5 | 75:25 | 3.98 | 94 |
| Example 11 | 1 | 106 | 2.5 | 75:25 | 3.76 | 90 |
| Example 12 | 11 | 80 | 0.5 | 60:40 | 3.98 | 90 |
| Example 13 | 11 | 80 | 1 | 60:40 | 4.18 | 92 |
| Example 14 | 11 | 80 | 1.3 | 60:40 | 4.56 | 94 |
| Example 15 | 11 | 80 | 3.8 | 60:40 | 4.56 | 95 |
| Example 16 | 11 | 80 | 5 | 60:40 | 4.16 | 92 |
| Example 17 | 11 | 80 | 5.7 | 60:40 | 4.05 | 92 |
| Example 18 | 24 | 70 | 2.5 | 40:60 | 3.92 | 92 |
| Example 19 | 24 | 70 | 2.5 | 50:50 | 4.56 | 93 |
| Example 20 | 24 | 70 | 2.5 | 80:20 | 4.37 | 95 |
| Example 21 | 24 | 70 | 2.5 | 90:10 | 4.03 | 91 |
| Example 22 | 1 | 45 | — | 75:25 | 3.13 | 90 |
| Example 23 | 1 | 50 | — | 75:25 | 3.97 | 92 |
| Example 24 | 1 | 56 | — | 75:25 | 4.15 | 93 |
| Example 25 | 1 | 89 | — | 75:25 | 4.13 | 93 |
| Example 26 | 1 | 100 | — | 75:25 | 3.77 | 92 |
| Example 27 | 1 | 106 | — | 75:25 | 3.31 | 91 |
| Comparative example 1 | C1 | 70 | 2.5 | 75:25 | 3.23 | 90 |
| Comparative example 2 | C2 | 70 | 2.5 | 75:25 | 3.66 | 92 |
| Comparative example 3 | C1 | 80 | 3 | 60:40 | 3.28 | 91 |
| Comparative example 4 | C2 | 80 | 3 | 60:40 | 3.56 | 92 |
| Comparative example 5 | C1 | 70 | — | 75:25 | 3.02 | 89 |

It can be seen from the examples shown in table 2 above, the binder composition of this application improves the ionic conductivity and enhances the cycling performance (such as the capacity retention) of the secondary battery. Comparison between examples 6 to 30 and comparative examples 1 to 5 shows that controlling the ratio of the polymer to ceramic particles, as well as the particle size and/or average pore size of the ceramic particles can result in a separator with higher ionic conductivity and better battery capacity retention.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:

1. A binder composition comprising a polymer and ceramic particles, the polymer comprising structural units derived from a first-type monomer, a second-type monomer, and a third-type monomer, and a molar ratio of the first-type monomer, second-type monomer, and third-type monomer being (50 to 58):(40 to 44):(2 to 6); wherein
the first-type monomer is selected from one or more compounds of formula I:

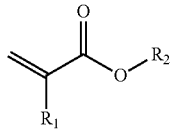

I wherein $R_1$ is selected from a hydrogen atom and a straight-chain or branched-chain C1-6 alkyl group, and $R_2$ is selected from a substituted or unsubstituted straight-chain or branched-chain C1-15 alkyl group, a C3-6 cycloalkyl group, and an isobornyl group, wherein in a case of substitution, a substituent is selected from a hydroxyl group and a C1-6 chain alkyl group;
the second-type monomer is selected from one or more compounds of formula II:

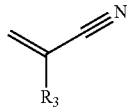

II wherein $R_3$ is selected from a hydrogen atom and a straight-chain or branched-chain C1-6 alkyl group; and
the third-type monomer is selected from one or more compounds of formula III:

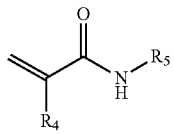

III wherein $R_4$ is selected from a hydrogen atom and a straight-chain or branched-chain C1-6 alkyl group, and $R_5$ is selected from a hydrogen atom, a hydroxy C1-6 alkyl group, and a C1-6 alkoxy group,
the polymer has a weight-average molecular weight of 60,000 to 120,000,
the ceramic particles have a median particle size $D_v50$ of 40 nm to 110 nm.

2. The binder composition according to claim 1, wherein $R_1$ is selected from a hydrogen atom and a methyl group, and $R_2$ is selected from a substituted or unsubstituted straight-chain or branched-chain C1-6 alkyl group, wherein in a case of substitution, a substituent is a hydroxyl group; and/or $R_3$ is selected from a hydrogen atom and a methyl group; and/or $R_4$ is selected from a hydrogen atom and a methyl group, and $R_5$ is selected from a hydrogen atom, a hydroxy C1-4 alkyl group, and a C1-4 alkoxy group.

3. The binder composition according to claim 1, wherein the first-type monomer is selected from one or more of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate; and/or
the second-type monomer is acrylonitrile or methacrylonitrile; and/or
the third-type monomer is selected from one or more of acrylamide, N-methylolacrylamide, and N-butoxymethacrylamide.

4. The binder composition according to claim 1, wherein the molar ratio of the first-type monomer, second-type monomer, and third-type monomer is (50 to 57):(41 to 44):(2 to 6).

5. The binder composition according to claim 1, wherein a weight ratio of the polymer and the ceramic particles is (40 to 90):(10 to 60), optionally (50 to 80):(20 to 50).

6. The binder composition according to claim 1, wherein the weight-average molecular weight of the polymer is 63,300 to 118,800.

7. The binder composition according to claim 1, wherein the median particle size $D_v50$ is 45 nm to 106 nm.

8. The binder composition according to claim 1, wherein the ceramic particles are porous particles and the porous particles have an average pore size of 0.3 nm to 6.0 nm, optionally 0.5 nm to 5.7 nm, more optionally 1.0 nm to 5.0 nm, and further more optionally 1.3 nm to 3.8 nm.

9. The binder composition according to claim 1, wherein the ceramic particles are porous silica particles.

10. The binder composition according to claim 1, wherein the polymer is applied to the ceramic particles.

11. A separator comprising a base layer and a coating layer disposed on at least one surface of the base layer, wherein the coating layer comprises a binder composition, the binder composition comprises a polymer and ceramic particles, the polymer comprises structural units derived from a first-type monomer, a second-type monomer, and a third-type monomer, and a molar ratio of the first-type monomer, second-type monomer, and third-type monomer being (50 to 58):(40 to 44):(2 to 6); wherein
the first-type monomer is selected from one or more compounds of formula I:

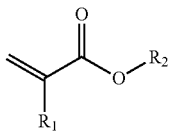

I wherein $R_1$ is selected from a hydrogen atom and a straight-chain or branched-chain C1-6 alkyl group, and $R_2$ is selected from a substituted or unsubstituted straight-chain or branched-chain C1-15 alkyl group, a C3-6 cycloalkyl group, and an isobornyl group, wherein in a case of substitution, a substituent is selected from a hydroxyl group and a C1-6 chain alkyl group;

the second-type monomer is selected from one or more compounds of formula II:

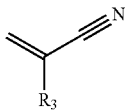

II wherein $R_3$ is selected from a hydrogen atom and a straight-chain or branched-chain C1-6 alkyl group; and the third-type monomer is selected from one or more compounds of formula III:

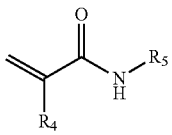

III wherein $R_4$ is selected from a hydrogen atom and a straight-chain or branched-chain C1-6 alkyl group, and $R_5$ is selected from a hydrogen atom, a hydroxy C1-6 alkyl group, and a C1-6 alkoxy group, the polymer has a weight-average molecular weight of 60,000 to 120,000, the ceramic particles have a median particle size $D_v50$ of 40 nm to 110 nm.

12. A secondary battery comprising a positive electrode plate, a negative electrode plate, an electrolyte, and a separator, wherein the separator comprises a base layer and a coating layer disposed on at least one surface of the base layer, wherein the coating layer comprises a binder composition, and the binder composition comprises a polymer and ceramic particles, the polymer comprises structural units derived from a first-type monomer, a second-type monomer, and a third-type monomer, and a molar ratio of the first-type monomer, second-type monomer, and third-type monomer being (50 to 58):(40 to 44):(2 to 6); wherein the first-type monomer is selected from one or more compounds of formula I:

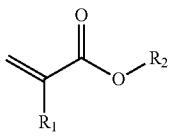

I wherein $R_1$ is selected from a hydrogen atom and a straight-chain or branched-chain C1-6 alkyl group, and $R_2$ is selected from a substituted or unsubstituted straight-chain or branched-chain C1-15 alkyl group, a C3-6 cycloalkyl group, and an isobornyl group, wherein in a case of substitution, a substituent is selected from a hydroxyl group and a C1-6 chain alkyl group;

the second-type monomer is selected from one or more compounds of formula II:

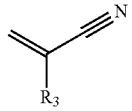

II wherein $R_3$ is selected from a hydrogen atom and a straight-chain or branched-chain C1-6 alkyl group; and the third-type monomer is selected from one or more compounds of formula III:

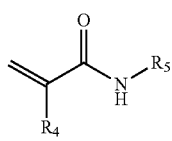

III wherein $R_4$ is selected from a hydrogen atom and a straight-chain or branched-chain C1-6 alkyl group, and $R_5$ is selected from a hydrogen atom, a hydroxy C1-6 alkyl group, and a C1-6 alkoxy group, the polymer has a weight-average molecular weight of 60,000 to 120,000, the ceramic particles have a median particle size $D_v50$ of 40 nm to 110 nm.

13. The separator according to claim 11, wherein $R_1$ is selected from a hydrogen atom and a methyl group, and $R_2$ is selected from a substituted or unsubstituted straight-chain or branched-chain C1-6 alkyl group, wherein in a case of substitution, a substituent is a hydroxyl group; and/or $R_3$ is selected from a hydrogen atom and a methyl group; and $R_4$ is selected from a hydrogen atom and a methyl group, and $R_5$ is selected from a hydrogen atom, a hydroxy C1-4 alkyl group, and a C1-4 alkoxy group.

14. The separator according to claim 11, wherein the first-type monomer is selected from one or more of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate;

the second-type monomer is acrylonitrile or methacrylonitrile; and the third-type monomer is selected from one or more of acrylamide, N-methylolacrylamide, and N-butoxymethacrylamide.

15. The separator according to claim 11, wherein the molar ratio of the first-type monomer, second-type monomer, and third-type monomer is (50 to 57):(41 to 44):(2 to 6).

16. The separator according to claim 11, wherein a weight ratio of the polymer and the ceramic particles is (40 to 90):(10 to 60).

17. The separator according to claim 11, wherein the weight-average molecular weight of the polymer is 63,300 to 118,800.

18. The separator according to claim 11, wherein the median particle size $D_v50$ is 45 nm to 106 nm.

19. The separator according to claim 11, wherein the ceramic particles are porous particles, and the porous particles have an average pore size of 0.3 nm to 6.0 nm.

20. The separator according to claim 11, wherein the ceramic particles are porous silica particles.

* * * * *